United States Patent [19]

Murata et al.

[11] Patent Number: 4,559,560

[45] Date of Patent: Dec. 17, 1985

[54] GHOST REDUCTION CIRCUIT FOR A TELEVISION RECEIVER

[75] Inventors: Toshinori Murata; Yuji Ito, both of Yokohama; Masafumi Kazumi, Tokyo, all of Japan

[73] Assignee: Hitachi, Ltd., Tokyo, Japan

[21] Appl. No.: 543,424

[22] Filed: Oct. 19, 1983

[30] Foreign Application Priority Data

Oct. 20, 1982 [JP] Japan ............................... 57-182821

[51] Int. Cl.⁴ .............................................. H04N 5/21
[52] U.S. Cl. .................................... 358/167; 358/905
[58] Field of Search ............... 358/167, 905; 307/362, 307/261, 236, 268

[56] References Cited

U.S. PATENT DOCUMENTS 4,161,700 7/1979 Fujikata et al. ...................... 307/362
4,303,895 12/1981 Ohnishi et al. ....................... 358/905

Primary Examiner—John C. Martin
Assistant Examiner—Howard L. Carter
Attorney, Agent, or Firm—Antonelli, Terry & Wands

[57] ABSTRACT

A ghost reduction circuit for a television receiver incorporating a transversal filter comprises a memory for storing tap gains of tap gain amplifiers constituting part of the filter, a detector for detecting a ghost component as an error signal by comparing a vertical sync signal of the video signal passed through the filter with a reference sync signal, a circuit for converting a differentiated signal derived through differentiation of the error signal into a 3-state digital signal, and a subtractor for correcting the tap gain data stored in the memory in accordance with the digital signal, wherein the ghost component is substantially eliminated from the video signal inputted to the filter by controlling the gains of the tap gain amplifiers in accordance with the corrected memory data. The differentiated signal-to-digital signal conversion circuit includes first and second comparators having substantially the same threshold and connected in parallel between the input terminal and a subtracter, and an inverter amplifier connected between the input terminal and the second comparator. The outputs of the first and second comparators are subtracted from each other through the subtracter to produce the digital signal.

8 Claims, 23 Drawing Figures

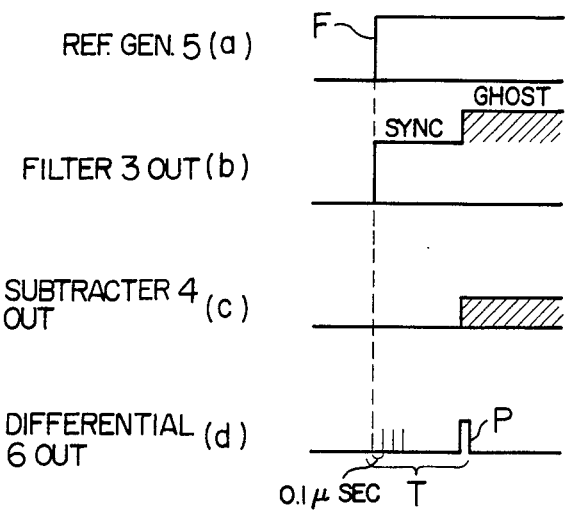
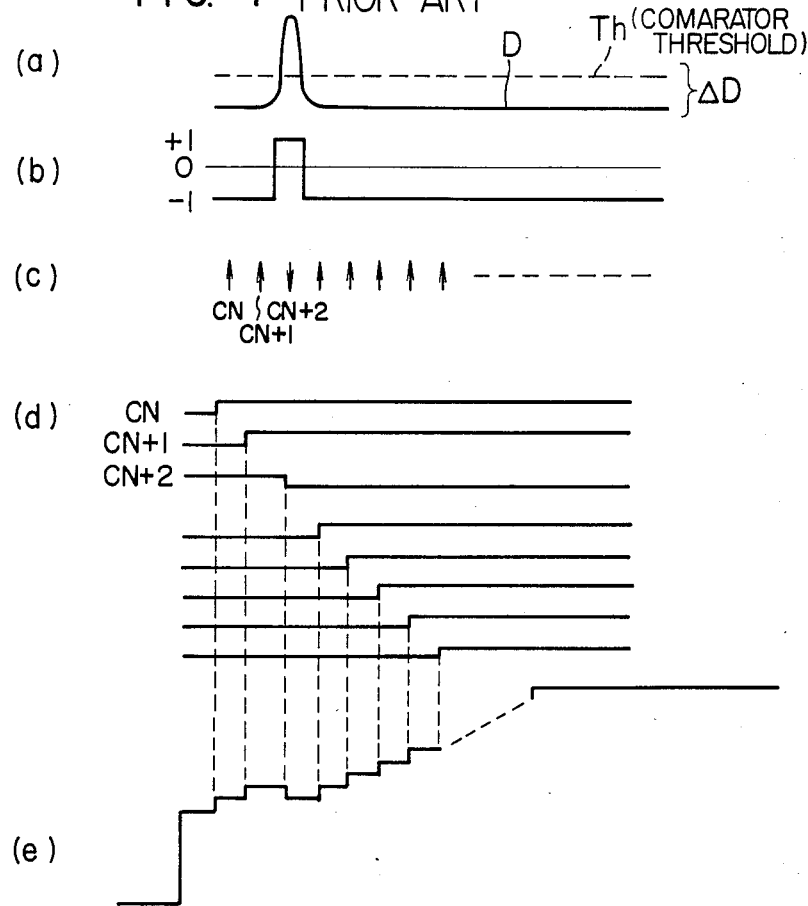

FIG. 5
PRIOR ART
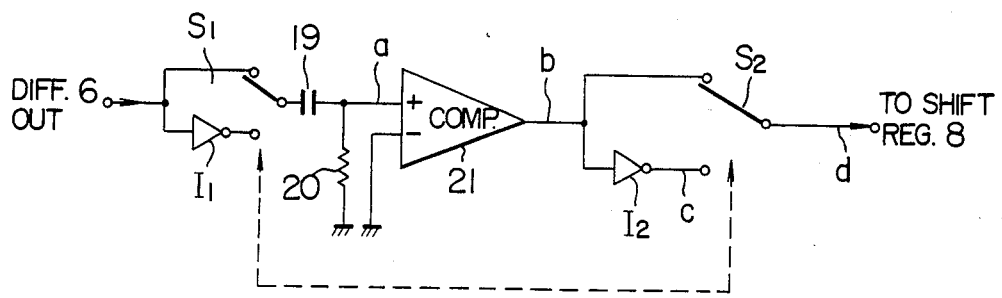
FIG. 6a
PRIOR ART
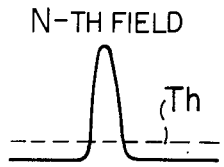 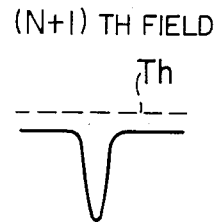
FIG. 6b
PRIOR ART
FIG. 6c
PRIOR ART
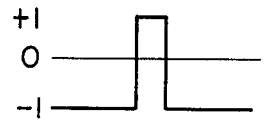
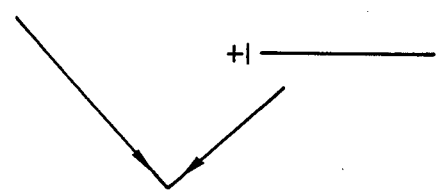
FIG. 6d
PRIOR ART
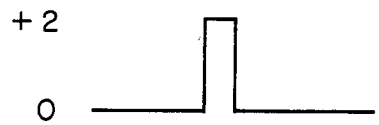

FIG. 9
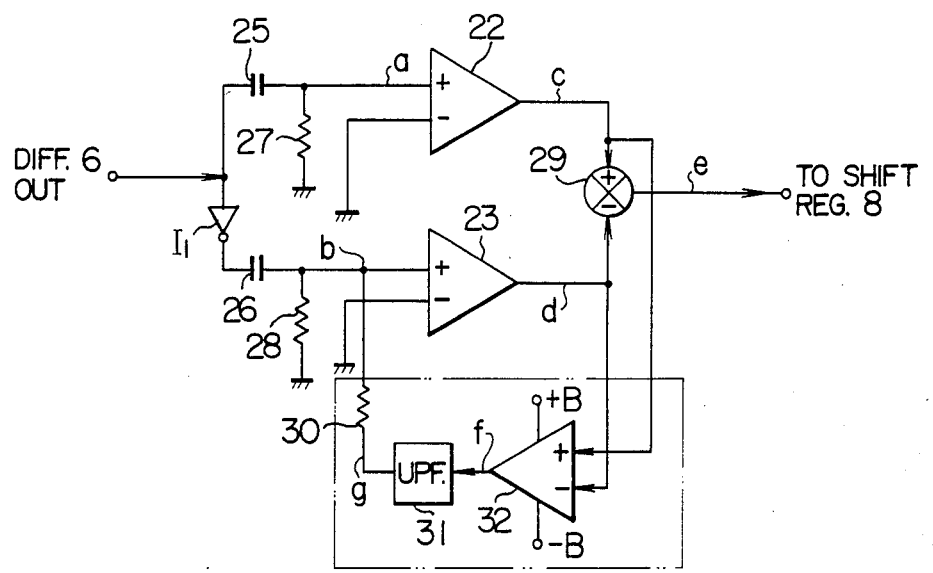
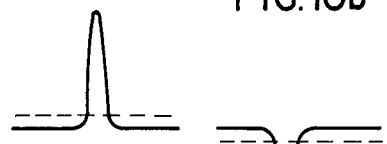
FIG. 10a   FIG. 10b
FIG. 10c   FIG. 10d
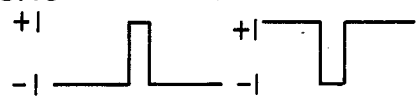
FIG. 10e   FIG. 10f   FIG. 10g
 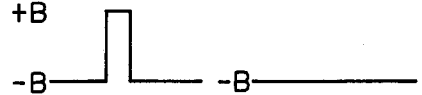

GHOST REDUCTION CIRCUIT FOR A TELEVISION RECEIVER

BACKGROUND OF THE INVENTION

The present invention relates to an apparatus or circuit for reducing a ghost phenomenon in a television receiver and in particular relates to an analog-to-digital conversion circuit suited for use in the ghost reduction circuit.

When an electromagnetic wave signal (desired wave) incoming directly from an antenna for transmission is received by a receiver antenna simultaneously with a reflected signal travelling over a longer path due to reflection at a large building, hill or the like, there makes appearance an undesired duplicate image deviated from the desired image on the screen of the television receiver. In other words, the so-called "ghost" is generated. In the television receiver, the phenomenon of ghost is one of the major causes for degradation in the quality of image. Accordingly, various measures have heretofore been taken for reducing or preventing the ghost. As one of the approaches, there can be mentioned a ghost reducing system in which a transversal filter is made use of for the video signal. In this ghost reducing system, a plurality of delay elements each exhibiting a minute delay time determined in dependence on the highest frequency component contained in the video signal are connected in series to one another, wherein output signals from the delay elements are appropriately weighted and added together in a factor applying circuit, to derive a compensated signal from which the ghost component is substantially eliminated.

Various circuit configurations for the ghost reduction circuit in which the transversal filter is used have heretofore been proposed. An example of such circuits is shown in a block diagram in FIG. 1 of the accompanying drawings. In this figure, a reference numeral 1 denotes an input terminal for a video signal, 2 denotes an output terminal for the video signal, 3 denotes a transversal filter, 4 denotes a subtraction circuit or subtracter, 5 denotes a reference signal generator circuit, 6 denotes a differentiating circuit or differentiator, 7 denotes a comparator, 8 denotes a shift register formed of 8 bit shift registers SN74164 of Texas Instruments, 9 denotes another subtractor, 10 denotes a tap gain memory, 11 denotes a digital-to-analog (D/A) converter, 12 denotes a synchronizing signal separator, and 13 denotes a timing generator.

FIG. 2 is a block diagram illustrating in detail an arrangement of the transversal filter 3 shown in FIG. 1. Referring to FIG. 2, a reference numeral 14 denotes a summing circuit or an adder, $15_1$ to $15_n$ denote delay elements each having a delay time $\tau$ where n may be 100, by way of example, and $16C_1$ to $16C_n$ denote tap amplifiers, respectively. With the term "tap amplifier", it is intended to mean the amplifier whose amplification gain can be varied in accordance with a control voltage supplied thereto from the tap gain memory 10 through the D/A converter 11.

In the first place, the operation of the circuit shown in FIG. 1 will be briefed.

The video signal applied to the input terminal 1 is transferred through the transversal filter 3 to the output terminal 2 to be supplied to a succeeding circuit stage. In case the input video signal contains the ghost component, the latter is substantially eliminated or reduced before being sent out to the output terminal 2. To this end, it is necessary to detect the ghost component possibly contained in the video signal produced by the transversal filter 3.

In this connection, it will be technically convenient for the ghost detection to select the vertical synchronizing signal and detect the ghost component possibly superposed on the vertical synchronizing signal. The reason may be explained as follows. Suppose that the ghost component superposed on the picture signal is detected. Then, difficulty will be encountered in the detection of the ghost, because the picture signal varies constantly. Accordingly, it is preferred to detect the ghost component superposed on the vertical synchronizing signal.

The vertical synchronizing signal is separated from the video signal applied to the input terminal 1 by means of the synchronizing signal separating circuit 12. The synchronizing signal thus separated is supplied to the timing generator circuit 13 to be made use of as the reference signal for generating a timing signal. The reference signal generator circuit 5 which may be constituted by a one-shot multivibrator, by way of example, generates the reference signal, i.e. the ghost-free sync reference signal on the basis of the vertical synchronizing signal under the timing commanded by the timing generator circuit 13. Accordingly, the ghost component superposed on the vertical synchronizing signal of the video signal can be determined by subtracting through the subtracter 4 the vertical synchronizing signal contained in the video signal outputted from the transversal filter and the vertical synchronizing signal outputted as the reference signal by the reference signal generator 5 from each other.

The ghost component is applied to the differentiating circuit 6 whose output signal is a positive going pulse ($\phi = 0$) for the in-phase ghost while the differentiated output signal is a negative going pulse ($\phi = 180°$) for the out-of-phase ghost. The output signal of the differentiating circuit 6 is digitalized (binary state-encoded with respect to ghost component polarity) through the comparator 7, the resulting digital output being loaded into (written in) the shift register 8. The timing for the loading operation is controlled by the timing generator 13. The data of gain stored in the tap gain memory 10 is updated in dependence on the data read out from the shift register 8. More specifically, data read out from the memory 10 is correctively modified through the subtracter 9 in accordance with the data read out from the shift register 8, wherein the corrected (updated) data is again written in the memory 10.

Upon completion of the process described above, the tap gain data is subsequently read out from the memory 10 to be supplied to the D/A converter 11, the analog output signal of which is then applied to the amplifiers $16C_1 - 16C_n$ (FIG. 2) constituting parts of the transversal filter 3 for controlling the amplification factor or gain thereof. This results in that the video signal which has the ghost component reduced is outputted from the transversal filter 3. By repeating the process described above for 8 seconds, for example, there can be ultimately obtained the video output signal from the transversal filter 3 which signal has substantially no ghost component superposed thereon.

In the foregoing, the outline of the operation of the ghost reduction circuit shown in FIG. 1 has been described. Now, the ghost detection signal processing operation will be described below in detail by referring to FIG. 3 which illustrates signal waveforms produced at main circuit points in the circuit shown in FIG. 1.

Referring to FIG. 3, a waveform (a) represents the vertical synchronizing signal outputted as the reference signal from the reference signal generating circuit 5. The waveform (a) has a leading edge indicated by F. The vertical synchronizing signal contained in the video signal outputted from the transversal filter 3 is represented by a waveform (b), wherein the superposed ghost component is represented by a hatched portion. A waveform (c) represents the ghost component resulting from the subtraction performed by the subtracter 4, while a waveform (d) represents the differentiated output pulse P resulted from differentiation of the ghost signal (c). When a control signal (gate pulse) is supplied to the shift register 8 from the timing generator circuit 13 in timing with the leading edge F of the vertical synchronizing signal to thereby initiate the operation of the shift register 8 at that time point, the binary output (indicating the ghost polarity) of the pulse signal P is fetched by the shift register 8 at a time point delayed by T relative to the appearance of the leading edge F for the purpose of performing the low-speed data processing to the memory 10 mentioned hereinbefore. As the consequence, ghost data or information including a series of bits is stored in the shift register 8 and sequentially outputted to the subtracter 9.

Subsequently, the correcting or updating operation of data stored in the tap gain memory 10 is started. The tap gain memory 10 has addresses which correspond to the tap amplifiers $16C_1$, $16C_2$, ... and $16C_n$ (shown in FIG. 2), respectively, whereby the tap gain data placed at the respective addresses are correctively modified in the order of the input signals having the minimum delay time to the input signal of the maximum delay time, i.e. in the order of the input signals corresponding to the amplifiers $16C_1$, $16C_2$, $16C_3$, ... and $16C_n$.

Upon completion of correction of the data stored in the tap gain memory, operation is then triggered to supply the tap gain data thus updated to the individual tap amplifiers $16C_1$, $16C_2$, ... and $16C_n$, respectively, which are included in the transversal filter 3. More specifically, data read out from the tap gain memory 10 are converted into the corresponding analog voltages, respectively, through the D/A converter 11 to be applied to the individual tap amplifiers $16C_1$, $16C_2$, ... $16C_n$, respectively. The applied voltages are charged in capacitors of a small capacity (not shown) provided in association with the individual amplifiers 16C, respectively, to be thereby sampled and held. When the voltages representative of the tap gain data read out from the memory 10 have been completely applied to the corresponding tap amplifiers, respectively, the voltage application is again started, beginning with the tap amplifier $16C_1$. By repeating this process, the capacitors mentioned above are prevented from discharging.

The process including the detection of the ghost, the correction of data stored in the tap gain memory 10 and application of the control voltages to the associated tap amplifiers 16C as described above is performed once for one field of the video signal, since the vertical sync signal is made use of as the reference signal. This process is repeated until the ghost is no more detected. In this way, the ghost component can be progressively reduced.

In the ghost reduction circuit of the type described above, there arises a serious problem in conjunction with differentiation of the detected ghost component and the binary encoding of the differentiated signal as performed by the differentiating circuit 6 and the comparator 7 shown in FIG. 1. This problem will be discussed below in more concrete by referring to FIG. 4.

It is assumed that the output of the differentiating circuit (the circuit 6 shown in FIG. 1) is of such a waveform as illustrated in FIG. 4 at (a), wherein a broken line Th represents a threshold level of the succeeding comparator 7. In most of applications, the output signal of the differentiating circuit 6 has a DC level D which usually differs from the threshold level Th, as a result of which a DC offset $\Delta D$ is involved between the DC level D and the threshold level Th, the DC offset $\Delta D$ being difficult to be suppressed to or below 1 mV. Consequently, the output signal of the comparator 7 is of such a waveform as illustrated at (b) in FIG. 4. More specifically, the two-type output signal of the comparator 7 takes a value of "+1" for the portion exceeding the threshold value Th while taking a value of "−1" for the portion below the threshold level Th. The comparator output becomes "0" in absence of the ghost. Accordingly, the directions of corrections of data $C_N$, $C_{N+1}$, $C_{N+2}$, ... $C_{N+n}$ stored in the tap gain memory 10 (FIG. 1) are all positive because the binary output of the comparator 7 is at the level of "−1", except for the data corresponding to the differentiated pulse signal produced due to the ghost, as is shown at (c) in FIG. 4. Thus, the output signals of the individual tap amplifiers are of such waveforms as shown at (d) in FIG. 4, respectively, whereby an output signal of the transversal filter 3 representative of a sum of the output signals of these tap amplifiers is of such a waveform as shown at (e) in FIG. 4. As will be seen, the tap gain corresponding to the differentiated pulse produced due to the ghost component is decreased to be effective for cancelling the ghost components. In contrast thereto, all the other tap gains tend to be uniformly increased in an effort to cancel out the binary output signal of "−1" produced due to the presence of the DC offset $\Delta D$. In other words, the stepwise waveform is tilted.

Magnitude of the tilt is given by $N \cdot \Delta D$ where $\Delta D$ represents the DC offset and N represents the number of the tap amplifiers of the transversal filter. It is assumed by way of example, that the DC offset is sufficiently small so that $\Delta D = 1$ mV, and that the delay time imparted to each delay element 15 is 100 nS. In order to be able to reduce the ghost of 10 μS. N must be so selected that $$N = \frac{10 \mu S}{100 nS} = 100$$

Accordingly, magnitude of the tilt is given by $$N \cdot \Delta D = 100 \times 1 \text{ mV} = 100 \text{ mV}$$

In this connection, it is noted that the vertical sync signal has an amplitude of about 300 mV. This means that magnitude of the tilt amounts to one third of the amplitude of the vertical sync signal even when the DC offset is suppressed to 1 mV, to bring about remarkable degradation in the picture quality.

As a method of suppressing the tilt, there may be mentioned proposals disclosed, for example, in Japanese Laid-Open Patent Application No. 109023/1980 (Japanese Patent Application No. 15646/1979) and Japanese Laid-Open Patent Application No. 29552/1979.

The system disclosed in Japanese Laid-Open Patent Application No. 109023/1980 (refer to FIG. 4 of this prior application) is shown in FIG. 5 of the accompanying drawings. In this figure, $I_1$ denotes an inverter amplifier, $I_2$ denotes an inverter, $S_1$ and $S_2$ denote switches interlocked so that they are changed over every field, 19 denotes a capacitor, 20 denotes a resistor, and 21 denotes a comparator.

At the N-th field, the interlocked switches $S_1$ and $S_2$ are thrown to the respective upper contacts as viewed in FIG. 5. At the (N+1)-th field, these switches are changed over to the respective lower contacts.

FIGS. 6a to 6b illustrate waveforms of signals appearing, respectively, at circuit points (a) to (d) in the system shown in FIG. 5.

Description will be made of the assumption that the output signal of the differentiating Circuit 6 is of positive (+) polarity and that the input DC voltage to the comparator 21 is lower than the threshold level Th thereof.

The input signal to the comparator 21 at the N-th field is illustrated in FIG. 6a. Accordingly, a data signal of "+1" is supplied to the shift register 8 (FIG. 1) only when the differentiated signal is present, while otherwise a data signal of "−1" is supplied to the shift register 8, as is shown in FIG. 6b. On the other hand, at the (N+1)-th field, the signal input to the comparator 21 is lower than the threshold value Th, resulting in that the output signal of the comparator 21 is at "−1", as is seen from FIG. 6b, and that the output signal of the inverter $I_2$ is "+1", as is shown in FIG. 6c. The data stored in the tap gain memory 10 (FIG. 1) are corrected on the basis of the binary (two-type) data thus obtained. This correction is performed once for every detection of ghost (1/60 sec. ×2). As a result, the DC offset of the comparator is compensated by twice ghost detections. The corrected values for the two successive fields are added together (refer to FIG. 6d). Accordingly, the corrected and summed value takes "+2" only for the differentiated signal produced in correspondence with the ghost while otherwise taking "0" notwithstanding of the DC offset. In the latter case, correction of the contents of the tap gain memory is not performed in appearance. Same applies true to the case where the output signal of the differentiating circuit is of inverse polarity or the case where the input DC level to the comparator 21 is higher than the threshold level.

As will be appreciated from the foregoing, the arrangement shown in FIG. 5 does not perform the correction of memory data in appearance even when an error due to the DC offset is present, whereby the occurrence of the tilt mentioned above in conjunction with the waveform shown at (e) in FIG. 4 can be prevented.

However, when consideration is made to the single field, the tilt mentioned hereinbefore which is reciprocated at a high speed is really produced. As the consequence, flicker of 30 Hz due to the tilt makes appearance on the image screen and provides an eyesore, giving rise to a new problem.

The system (analog-to-digital converter) taught in Japanese Laid-Open Patent Application No. 29552/1979 is designed to operate on substantially the same principle as mentioned above. More specifically, as an attempt to prevent the occurrence of error due to the analog-to-digital conversion, the converted value of an input signal per se which contains the error due to the conversion and the converted value containing the error due to conversion of the other input signal having the inverted polarity are subjected to addition/subtraction on the time series basis for obtaining the correctly converted value. In the ghost reduction circuit to which this prior art is applied, it requires two fields to obtain the correctly converted value because the input signals are present only in a predetermined time interval due to the fact that the vertical sync signal is utilized as the reference signal, presenting also a problem that the flicker is produced.

SUMMARY OF THE INVENTION

It is an object of the present invention to eliminate the difficulties of the prior art systems described above and provide a progressive-convergence type ghost reduction circuit or apparatus which is capable of reducing effectively the influence of the DC offset of the comparator to thereby suppress the tilt and hence flickers.

In view of the above object, it is proposed according to one concept of the present invention that first and second comparators having the same threshold value are provided, wherein the first comparator has an input to which the differentiated output of a differentiating circuit is applied, while the second comparator has an input supplied with an inverted signal of the differentiated output. By determining the difference in the output signal between the first and the second comparator, corrected values for a tap gain memory is determined within a single field. In case the threshold values of the two comparators do not perfectly coincide with each other, a difference in the threshold value between the first and the second comparator is detected, whereby a correct analog-to-digital converting operation is accomplished by correcting the input DC voltages to the comparators on the basis of the results of the detection.

BRIEF DESCRIPTION OF THE DRAWINGS

FIG. 3 illustrates waveforms of signals appearing at main circuit points of the circuit shown in FIG. 1.

FIG. 4 is a view for clarifying the problem in the hitherto known ghost reduction circuit.

FIG. 5 shows in a circuit diagram a circuit arrangement so configured as to dispose of the problem illustrated in conjunction with FIG. 4.

FIGS. 6a to 6d are diagrams showing waveforms of signals produced at corresponding circuit points in the circuit shown in FIG. 5.

FIG. 9 is a circuit diagram showing another embodiment of the invention.

FIGS. 10a to 10g are diagrams showing waveforms of signals making appearance at corresponding circuit points in the circuit shown in FIG. 9.

DESCRIPTION OF THE PREFERRED EMBODIMENTS

Figure 1:
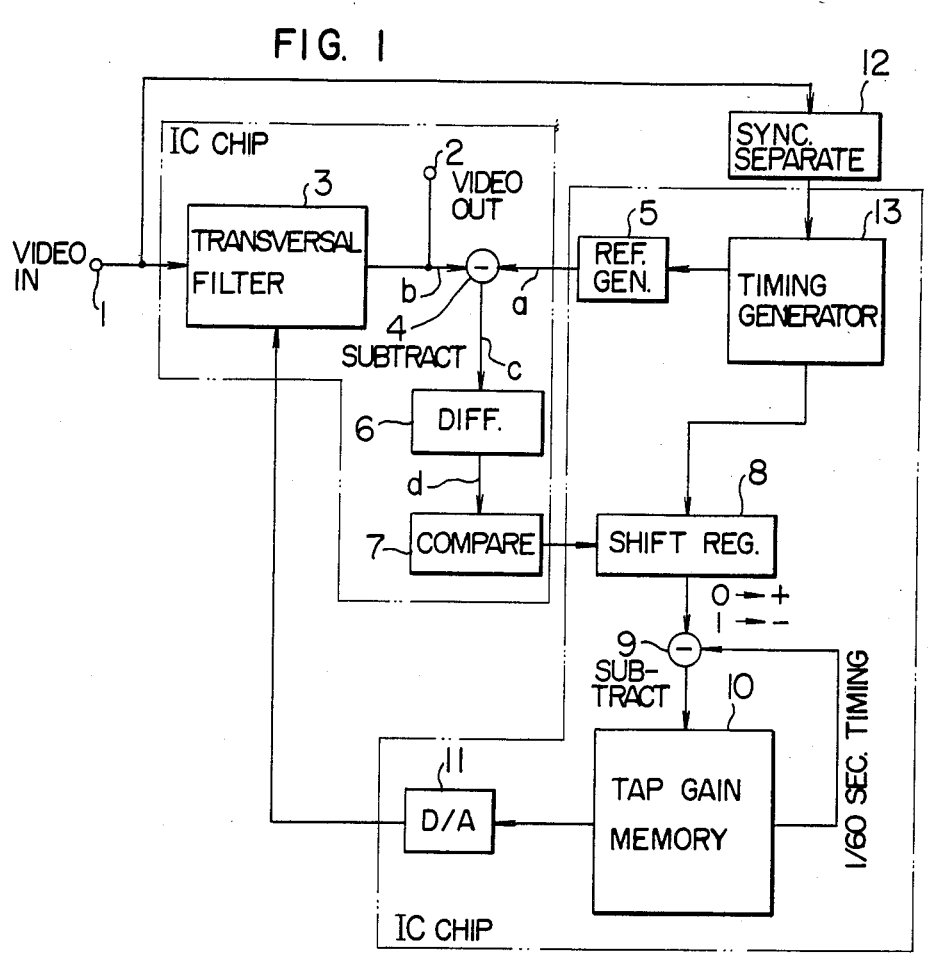
FIG. 1 shows in a block diagram an example of the ghost reduction circuit to which the present invention can be applied.
Figure 2:
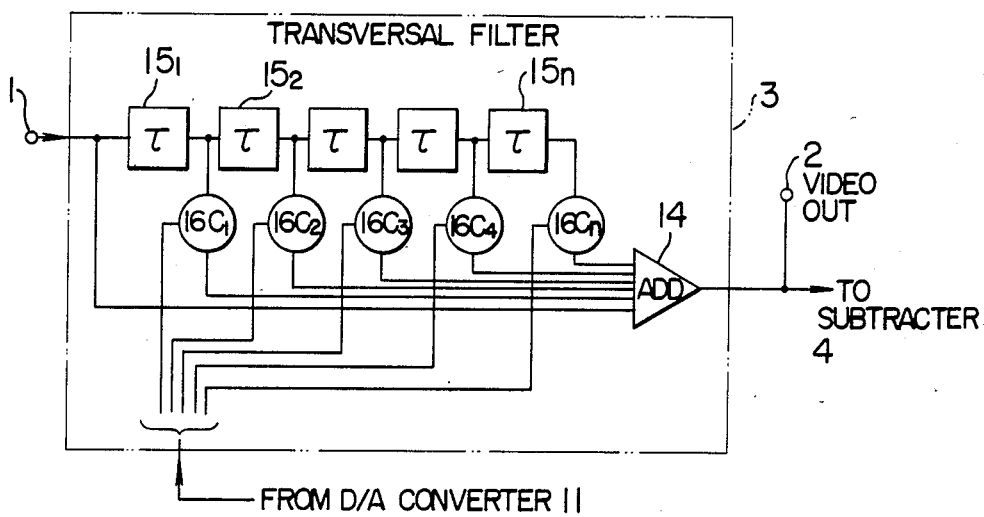
FIG. 2 is a block diagram showing in detail a circuit configuration of a transversal filter used in the ghost reduction circuit shown in FIG. 1.

In the following, the present invention will be described in conjunction with the exemplary embodiments thereof by referring to the drawings.

Figure 7:
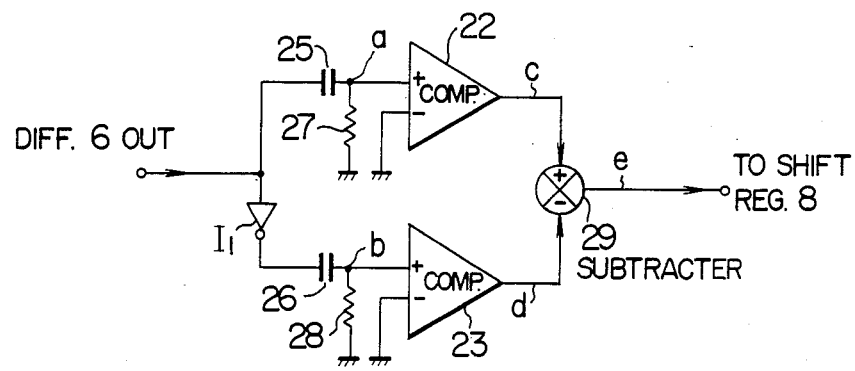
FIG. 7 is a circuit diagram showing an exemplary embodiment of the present invention.

FIG. 7 shows an exemplary embodiment of the invention. In this figure, reference numerals 22 and 23 denote, respectively, comparators each of which may usually be constituted by a differential amplifier, $I_1$ denotes an inverter amplifier, 25 and 26 denote capacitors, 27 and 28 denote resistors, and 29 denotes a subtracter of logical configuration. More specifically, the subtracter 29 may be constituted by using TTL IC, SN 74283 type adders of Texas Instruments or the like. The input to the circuit shown in FIG. 7 is provided by the output signal of the differentiating circuit shown in FIG. 1, while the output of the circuit shown in FIG. 7 provides the input signal to the shift register 8 shown in FIG. 1.

It should here be mentioned that the comparators 22 and 23 are implemented as an integrated circuit in the same chip at locations close to each other and realized in same orientation and configuration so that these comparators have the respective threshold values which coincide with each other at extremely high accuracy. Further, the inputs to the comparators 22 and 23 provide bias voltages to them through the resistors 27 and 28, which bias voltages are close to the threshold values of the comparators 22 and 23, respectively. The capacitors 25 and 26 serve to decouple the DC voltage of the output of the differentiating circuit 6 (FIG. 1) directly and indirectly by way of the inverter $I_1$, respectively.

FIGS. 8a to 8e show waveforms of signals making appearance at circuit points (a) to (e) for four statuses 1 to 4, respectively.

Figure 8:
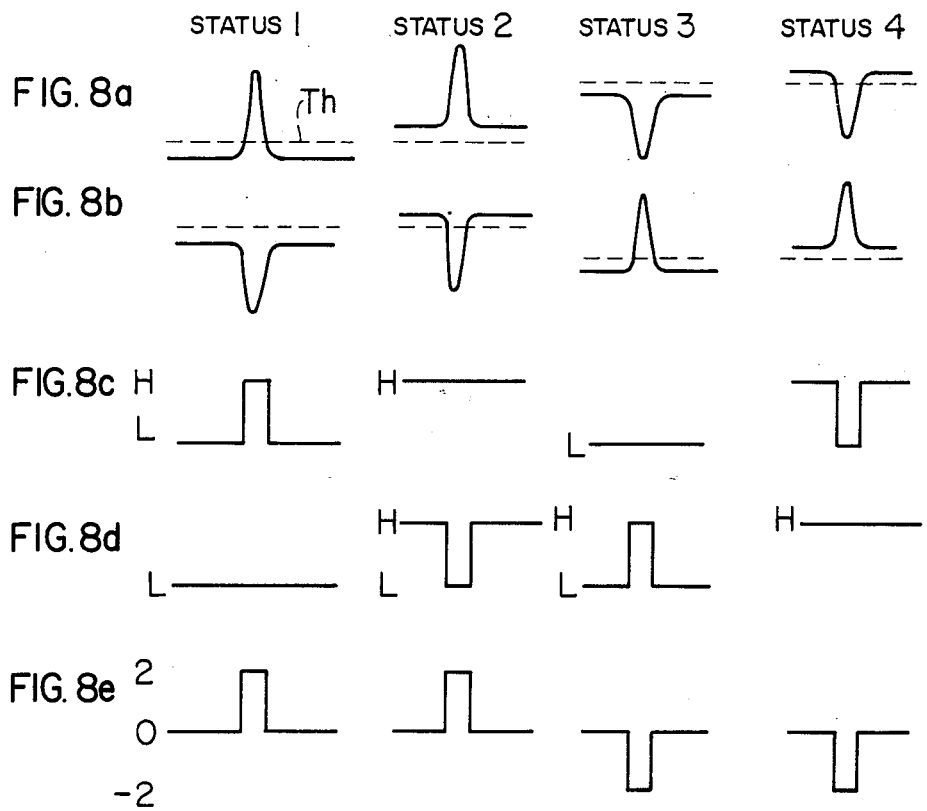
FIGS. 8a to 8e are diagrams showing waveforms of signals appearing at corresponding circuit points in the circuit shown in FIG. 7.

The operation of the circuit shown in FIG. 7 will be described by referring to FIGS. 8a to 8e. In the case of the status 1, for example, it is assumed that the input to the comparator 22 is such that the differentiated output of the circuit 6 (FIG. 6) is a positive-going pulse where the DC level indicated by a broken line is lower than the threshold value Th of the comparator 22, as is shown in FIG. 8a. On the other hand, the input to the comparator 23 is a negative-going pulse because the output of the differentiating circuit 6 is beforehand inverted by the inverter $I_1$. Further, the threshold value and the bias voltage of the comparator 23 are essentially the same as those of the comparator 22. Accordingly, the DC level of the input to the comparator 23 is also lower than the threshold value Th thereof. This situation is shown in FIG. 8b at the leftmost column. Consequently, the outputs of the comparators 22 and 23 are such as shown at the leftmost columns in FIGS. 8c and 8d, respectively. When the difference between the outputs (FIG. 8c and FIG. 8d) of the comparators 22 and 23 is determined by the subtracter 29, the output signal of the latter is such as shown at the leftmost column in FIG. 8e. That is, the output of the subtracter 29 takes the level of "+2" only when the differentiated output signal is produced by the differentiating circuit 6 (FIG. 1), and otherwise remains at the level of "0(zero)".

Similarly, in the cases of the status 2 where the differentiated output signal is a positive pulse and the DC level is higher than the threshold level Th, the status 3 where the differentiated output is a negative pulse and the DC level is lower than the threshold level Th, and the status 4 where the differentiated output is a negative pulse and the DC level is higher than the threshold level Th, the output signals of the subtracter 29 are such as shown in FIG. 8e at the other columns, respectively. It will be seen that the output signal of the subtracter 29 takes a level of "+2" or "−2" only when the differentiated output is produced and otherwise remains at a level of "0". In this manner, the differentiated output signal can be definitely discriminated from the DC offset within a single field, because the output of the subtracter 29 is always at the level of "0" for the DC offset. Accordingly, the values contained in the tap gain memory 10 (FIG. 1) is not corrected for the DC offset, whereby the tilt can be suppressed without giving rise to generation of the flickers described hereinbefore.

A second exemplary embodiment of the invention is shown in FIG. 9, while the waveforms of signals produced at corresponding points of the circuit shown in FIG. 9 are illustrated in FIGS. 10a to 10g. In FIG. 9, the same parts as those shown in FIG. 7 are denoted by like reference symbols. Referring to FIG. 9, a reference numeral 30 denotes a resistor, 31 denotes a low pass filter and 32 denotes a differential amplifier.

In the case of the embodiment shown in FIG. 7, it is safe to say that the threshold values of the comparators 22 and 23 will usually coincide with each other with an essentially high accuracy because they are realized in the same IC chip. However, there may arise such case where the threshold values of these comparators do not coincide within the tolerable range of accuracy because of dimensional unevenness possibly brought about due to the manufacturing process as actually adopted. In that case, the tilt will be necessarily generated. More specifically, when the threshold levels of the comparators 22 and 23 become different from each other as indicated by broken lines in FIGS. 10a and 10b for the reason mentioned above, the corrected signal of the level "+2" can certainly be obtained at the output of the subtracter 29 in response to the differentiated output of the circuit 6 (FIG. 1), as is shown in FIG. 10e. In this case, however, the output of the subtracter 29 will undesirably take the level of "−2" for the DC offset, whereby correction of the tap gains is performed to thereby bring about generation of the tilt described hereinbefore.

The differential amplifier 32, the low pass filter 31 and the resistor 33 are additionally provided with the intention of evading the problem mentioned above. Describing in more detail, when the threshold levels of the comparators 22 and 23 employed in the circuit shown in FIG. 7 differ from each other, the output signals of the comparators 22 and 23 are such as shown in FIGS. 10c and 10d, respectively. To deal with the problem described above, the outputs (c) and (d) of the comparators 22 and 23 are inputted to the differential amplifier 32. Then, the output voltage (f) of the latter takes the level of "+B" only when the ghost component is present and otherwise takes the level of "−B", as is shown in FIG. 10f. The output (f) of the differential amplifier 32 is supplied to the input of the low pass filter 31. By selecting the cut-off frequency of this filter 31 to be sufficiently low, the output signal of the amplifier 32 corresponding to the ghost component is attenuated, resulting in that a constant DC voltage of "−B" is obtained as the output of the filter 31. This voltage is applied to the signal input terminal of the comparator 23 by way of the feedback resistor 30, to thereby lower the input DC level. As the DC level of the input signal to the comparator 23 is thus lowered, the output voltage level thereof on an average is progressively lowered to eventually attain the steady state of "−1". As the consequence, the value of correction for the DC offset is "0". At that time, the output of the low pass filter 31 is also zero, whereby the aforementioned input biasing condition is maintained. In this way, generation of the tilt can be suppressed.

In the case of the embodiment shown in FIG. 9, correction of the DC level of the comparator 23 has to be performed before the tilt is generated. In this connection, it is noted that a single correction on the tap gain memory 10 requires 17 m sec. (=1/60) because the correction is carried out once for every field. Accordingly, correction of the input DC level to the comparator 23 can be perfectly completed within the time mentioned above because the correction in concern can be effected at any time point of the television signal. The memory 10 may be of a 10-bit type where one bit is used as the polarity bit with the other 9 bits being allotted for the gain control, to thereby output the gain control data at 512 steps.

The above description on the operation of the circuit shown in FIG. 9 applies valid independent of the polarity of the output signal of the differentiating circuit 6 and the relation between the threshold values of the comparators 22 and 23.

It will now be appreciated from the foregoing description that according to the illustrated embodiments of the invention, the error due to the ghost can be discriminated from the error due to the DC offset within one field by virtue of the use of two comparators realized in the same chip at locations close to each other, to thereby allow the correction of the tap gains to be omitted for the DC offset. Thus, the tilt can be suppressed without giving rise to generation of the flicker in the output signal of the transversal filter, whereby an improved ghost reducing operation can be attained while preventing the image quality from being deteriorated. Additionally, no adjustment is required for reducing the offset of the comparators, which in turn facilitates the design and implementation of the comparators themselves. Besides, even when the comparators have respective threshold levels differing from each other, the difference can be automatically compensated to assure constantly the correct operation.

I claim:

1. A ghost reduction apparatus for a television receiver, comprising: a transversal filter; a tap gain memory for storing tap gains of tap amplifiers included in said transversal filter; detecting means for detecting as an error signal a ghost component contained in a video signal passed through said transversal filter by comparing a first predetermined reference signal contained in said video signal with a second reference signal produced in association with said first reference signal; converting means for converting a differentiated output signal derived from said error signal through differentiation into a digital signal; and correcting means for correcting the tap gain data stored in said tap gain memory in accordance with said digital signal,
wherein said means for converting said differentiated output signal into the digital signal includes a first comparator having an input supplied with said differentiated output signal, a second comparator having an input supplied with an inverted signal of said differentiated output signal and an arithmetic circuit for processing arithmetically the output signals of said first and second comparators,
said ghost component being substantially reduced from said video signal passed through said transversal filter by controlling the gains of the individual tap amplifiers included in said transversal filter in accordance with the corrected data read out from said tap gain memory.

2. A ghost reduction apparatus according to claim 1, wherein said converting means for converting the differentiated output signal into the digital signal includes a first differential amplifier receiving the differentiated signal of a first polarity, a second differential amplifier receiving the differentiated signal of a second polarity opposite to said first polarity through an inverter amplifier, and subtracting means having inputs coupled to the outputs of said first and second differential amplifiers, respectively; said first and second differential amplifiers having respective inverting input terminals connected to a reference potential and non-inverting input terminals each supplied with said differentiated signal through a DC-decoupling capacitor and resistor means for applying a bias of a level close to a threshold value of said differential amplifiers; said subtracting means subtracting the output signals of said first and second differential amplifiers from each other to thereby generate a three-state digital signal.

3. A ghost reduction apparatus according to claim 2, wherein said first and second differential amplifiers are realized in the same semiconductor chip in the same orientation at locations close to each other, to thereby reduce non-uniformity in the threshold level of both of said first and second differential amplifiers.

4. A ghost reduction apparatus according to claim 2, further including a third differential amplifier for comparing the output signals of said first and second differential amplifiers with each other, a low pass filter having an input supplied with the difference output signal of said third differential amplifier for attenuating the output signal of said third differential amplifier which corresponds to the ghost component, and a feedback resistor for supplying the output of said low pass filter to the non-inverting input terminal of one of said first and second differential amplifiers.

5. A conversion circuit for converting a bipolar analog signal into a three-state digital signal, comprising:
(a) an analog signal input terminal and a three-state signal output terminal;
(b) first and second comparison amplifiers having substantially the same threshold level, each of said comparison amplifiers having a comparison input terminal supplied with said bipolar analog signal and a reference input terminal;
(c) an inverter amplifier connected between said signal input terminal and said second comparison amplifier for inverting the input analog signal;
(d) subtracting means coupled to the output terminals of said first and second comparison amplifiers for subtracting the outputs thereof from each other; and
(e) said signal output terminal being coupled to the output of said subtracting means for producing a three-state digital signal which is free of offsets of said comparison amplifiers.

6. A conversion circuit according to claim 5, wherein each of said first and second comparison amplifiers having the comparison input terminal connected to a DC-decoupling capacitor and a resistor which applies a bias of a level close to the threshold voltage of said comparison amplifiers.

7. A conversion circuit according to claim 5, wherein said first and second comparison amplifiers are realized in the same semiconductor chip in the same orientation at locations close to each other with an equal distance from a large current path.

8. A conversion circuit according to claim 5, wherein said bipolar analog signal is a signal of differentiated waveform.

* * * * *